US005455717A

United States Patent [19]

Van Doorn et al.

[11] Patent Number: 5,455,717
[45] Date of Patent: Oct. 3, 1995

[54] RECORDING DEVICE WITH TEMPERATURE-DEPENDENT WRITE-CURRENT CONTROL

[75] Inventors: Rudolf A. Van Doorn; Stephanus J. M. Van Beckhoven, both of Eindhoven; Gerardus W. A. Akkermans, Breda; Franciscus J. R. Verhallen; Abraham Hoogendoorn, both of Eindhoven, all of Netherlands

[73] Assignee: U.S. Philips Corporation, New York, N.Y.

[21] Appl. No.: 132,005

[22] Filed: Oct. 5, 1993

[30] Foreign Application Priority Data

Oct. 9, 1992 [EP] European Pat. Off. ............. 92203108

[51] Int. Cl.$^6$ ...................................................... G11B 5/09
[52] U.S. Cl. ................................ 360/6; 360/66; 360/25
[58] Field of Search ....................... 360/69, 71, 46, 360/60, 67, 31, 68, 53, 65, 66, 6, 25; 369/13, 116, 53, 54, 55

[56] References Cited

U.S. PATENT DOCUMENTS

| | | | |
|---|---|---|---|
| 4,772,964 | 9/1988 | Kaida | 360/67 |
| 5,148,329 | 9/1992 | Yamauchi et al. | 360/68 X |
| 5,168,395 | 12/1992 | Klaassen et al. | 360/46 |
| 5,182,742 | 1/1993 | Ohmori et al. | 369/116 |
| 5,233,596 | 8/1993 | Tani | 369/116 |
| 5,270,882 | 12/1993 | Jove et al. | 360/67 |

FOREIGN PATENT DOCUMENTS

| | | |
|---|---|---|
| 58-130412 | 8/1983 | Japan . |
| 60-143404 | 7/1985 | Japan . |

*Primary Examiner*—W. R. Young
*Assistant Examiner*—Varsha A. Kapadia
*Attorney, Agent, or Firm*—Edward W. Goodman

[57] ABSTRACT

A device for recording an information signal on a magnetic record carrier (2) includes a write amplifier (3), a magnetic head (4) of the magnetoresistive type, and a compensation circuit for controlling the amplitude of the write current in dependence upon temperature variations which occur during recording. The compensation circuit includes an actuator for bringing the record carrier into contact with the magnetic head (4) before a recording is started. In addition, detector means (17, 18) is provided to detect an output signal of the magnetic head produced as a result of the magnetic head being brought into contact with the record carrier. A control signal generator (17) generates a control signal whose magnitude is a measure of the magnitude of the output signal. The compensation circuit (3, 5, 8, 11, 17) is adapted to control the amplitude of the write current in dependence upon the control signal.

3 Claims, 1 Drawing Sheet

RECORDING DEVICE WITH TEMPERATURE-DEPENDENT WRITE-CURRENT CONTROL

BACKGROUND OF THE INVENTION

1. Field of the Invention

The invention relates to a device for recording an information signal on a magnetic record carrier, which device comprises an input terminal for receiving the information signal, a write amplifier, having an input coupled to the input terminal and having an output coupled to an input of a magnetic head, which write amplifier is adapted to drive the magnetic head with a write current of a given amplitude, and compensation means for controlling the amplitude of the write current in dependence upon temperature variations which occur during recording.

2. Description of the Related Art

Such a device is known from Japanese Kokai 60-143,404.

The compensation means in the prior-art device comprise a temperature detector arranged close to the magnetic head. The temperature detector detects the temperature in the proximity of the magnetic head and generates a control signal whose magnitude is a measure of this temperature. Subsequently, the compensation means control the amplitude of the write current in dependence upon the control signal so as to obtain a constant magnetization level in the record carrier at varying temperature.

The recording depth of the information signal in the record carrier appears to be dependent on the temperature of the record carrier during recording. A varying temperature consequently results in varying recording depths.

The recording level of a recording should preferably be as constant as possible and should have a specific value. This is of particular importance in apparatuses which do not have an erase head and which realize a new recording by overwriting the old recording. In the case of a non-constant recording level of the old recording in the record carrier, problems may arise in the sense that sometimes the old recording cannot be overwritten satisfactorily. This poses a problem particularly in view of the compatibility of record carriers, which requires that it should be possible for a record carrier on which an old recording has been made to be overwritten by means of another recording device not comprising an erase head. This means that said requirement of a recording depth which is as constant as possible applies both to devices with an erase head and devices without an erase head.

If this requirement is not met, it will not be possible to realize a satisfactory readout when a new recording written over an old recording in devices without an erase head is to be reproduced. By correcting the amplitude of the write current for said temperature variations during recording, the desired recording depth can be achieved for the entire recording with a satisfactory overwrite attenuation, thus enabling a satisfactory read quality of the newly recorded information to be achieved. Nevertheless, it has been found that in some cases the recording depth during a recording is not sufficiently constant.

SUMMARY OF THE INVENTION

It is an object of the invention to provide a device which is better capable of realizing the desired constancy of the recording depth.

This object is achieved inter alia in that according to the invention, the magnetic head is a magnetoresistive head, the compensation means comprise actuator means for bringing the record carrier into contact with the magnetic head before a recording is started, the compensation means further comprise detection means for detecting an output signal of the magnetic head produced as a result of the magnetic head being brought into contact with the record carrier, and the compensation means further comprise control signal generator means for generating a control signal whose magnitude is a measure of the magnitude of the output signal, and the compensation means are adapted to control the amplitude of the write current in dependence upon the control signal.

The invention is based on the recognition of the fact that, particularly when the record career is inserted into the device to make a recording, the temperature of the record carrier may exhibit large differences with the temperature of the magnetic head. If recording is started immediately the temperature sensor has measured the temperature of the magnetic head but the temperature measurement does not provide any information about the actual temperature of the record carrier. Consequently, the write current will not be set to the correct value at the beginning of the recording.

The MR head used in the device generally has an undesirable temperature dependence. The invention makes advantageous use of this undesired behavior. Since before the recording is started, the magnetic head is now brought into contact with the magnetic tape, the magnetic head will supply a thermally generated electric output signal whose amplitude is a measure of the temperature difference between the record carrier and the magnetic head. Now a first control signal is generated which is a measure of the magnitude of this output signal. This control signal is combined with the control signal generated by the temperature sensor and the write current is now controlled in dependence upon this combined control signal. As a result, the recording depth will have the desired value, also at the beginning of a recording process.

After some time, a situation of equilibrium will be obtained for the temperatures of the magnetic head and the record carrier. This means that the influence of the first control signal must gradually be reduced.

For this purpose, a preferred embodiment of the device is characterized in that the control signal generator means are further adapted to subsequently gradually reduce the influence of the control signal on the write current to zero as time elapses.

An exemplary embodiment of the invention will now be described in more detail in the following description with reference to the FIG. 1.

BRIEF DESCRIPTION OF THE DRAWING

The FIG. 1 shows an embodiment of the device having an input terminal 1 for receiving the information signal to be recorded on the record carrier 2.

DESCRIPTION OF THE PREFERRED EMBODIMENT

Figure 1:
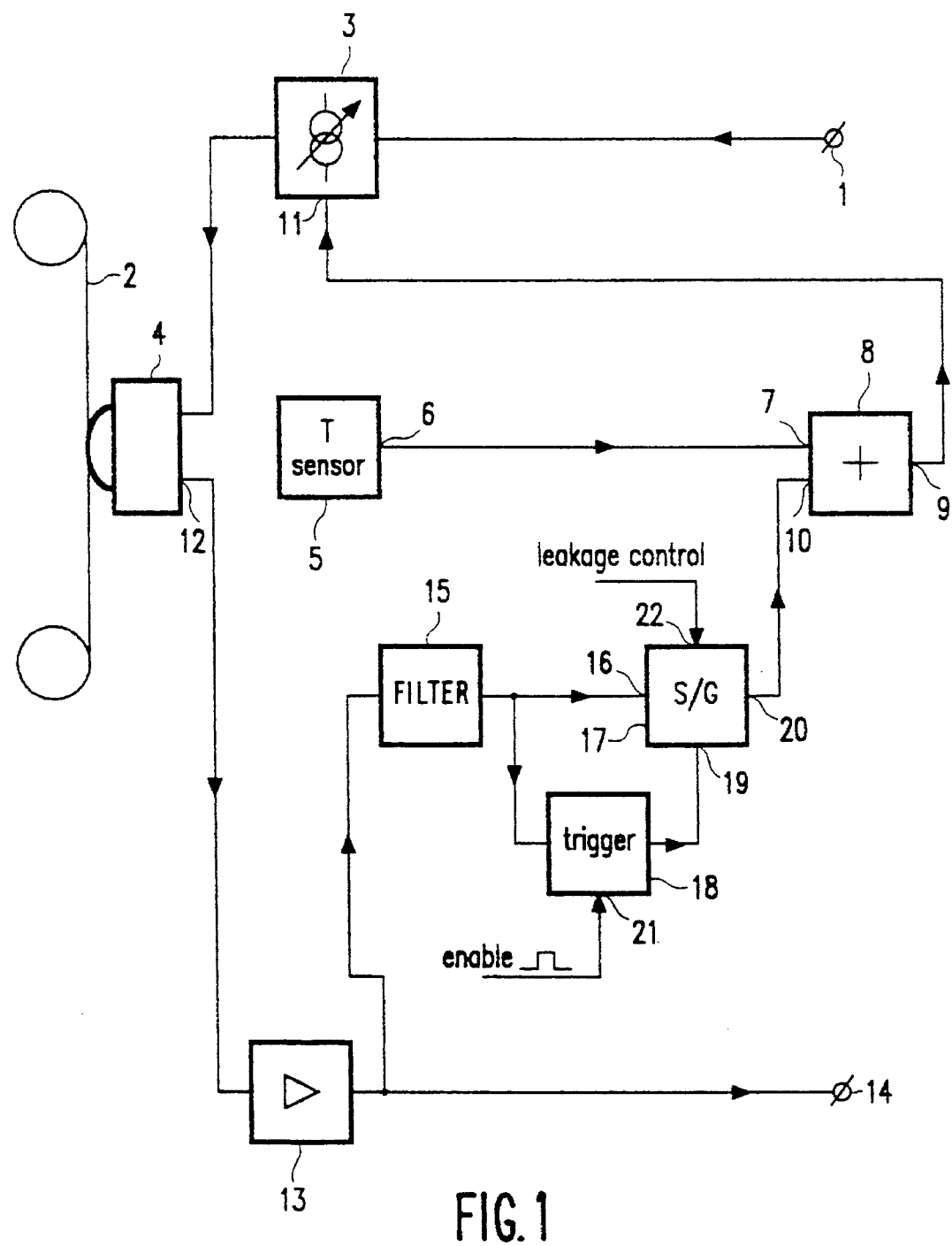

The information signal is applied to a write amplifier 3, which supplies the information signal to the magnetic head 4 as a write current of a given amplitude. A temperature sensor 5 is arranged near the magnetic head 4, which sensor measures the temperature of the magnetic head 4 and at its output 6 supplies a control signal which is a measure of the temperature of the magnetic head. This control signal is applied to an input 7 of a signal combination unit 8 in the form of an adder. The signal combination unit 8 has an output 9 coupled to a control signal input 11 of the write amplifier. The magnetic head 4 is a write-read head and is thus capable of reading the information signal recorded on the magnetic tape 2 in a reproduction mode. The information signal thus read is applied to an output 12 and is applied to an output terminal 14 via a read amplifier 13.

The output 12 of the magnetic head 4 is also coupled to an input 16 of a sample-and-hold circuit 17 via a filter circuit 15. The output of the filter 15 is also coupled to a trigger input 19 of the sample-and-hold circuit 17 via a trigger circuit 18. An output 20 of this circuit is coupled to a second input 10 of the combination unit 8.

During a recording, the device operates as follows. If a recording has already been in progress for some time the control signal applied to the input 10 of the combination unit 8 will be zero. The temperature sensor 5 measures the temperature of the magnetic head 4, which in this case will be substantially equal to the temperature of the record carrier 2. The control signal supplied by the sensor 5 is applied to the control signal input 11 of the write amplifier 3 via the combination unit 8 and under the influence of this signal the write amplifier 3 adapts the amplitude of the write current, the information signal to be recorded being recorded with this write current. In the case of a varying temperature the write-current amplitude will then be varied so as to obtain a constant recording depth in the record carrier.

If at the beginning of a recording, the record carrier 2 is introduced into the device, the record carrier 2 generally will not have the same temperature as the magnetic head 4. The control system using the temperature sensor 5 will therefore realize an incorrect write current setting. When the recording process is started, the device is therefore briefly set to the reproduction mode. Since the magnetic head 4 is brought into contact with the record carrier 2 by an actuator means, not shown, when the device is set to the reproduction mode an output signal will appear on the output 12. This output signal is pulse-shaped and is caused by the temperature difference between the record carrier 2 and the magnetic head 4, the pulse height being a measure of the magnitude of the temperature difference.

The output signal is applied both to the trigger circuit 18 and the sample-and-hold circuit 17 via the filter circuit 15. The filter 15 is intended for removing a magnetically generated output signal resulting from an old recording on the record carrier and for passing the thermally generated output signal of the head. The filter could be a low-pass filter or a band-pass filter. The trigger circuit 18 is activated by an enable signal, which is briefly applied to the input 21 when the device is set to the reproduction mode, and it detects the instant at which the pulse appears in the pulse-shaped output signal of the magnetic head 4. Under the influence of a detection signal applied to the control signal input 19 of the sample-and-hold circuit 17, upon detection of the pulse-shaped output signal of the magnetic head 4, the sample-and-hold circuit 17 stores the magnitude of the pulse and produces on its output 20 a control signal which is a measure of the magnitude of the pulse. This control signal is applied to the write amplifier 3 via the combination unit 8 in order to set the write current to the correct value. When subsequently the device changes over to the recording mode the information signal to be recorded is now recorded with the correct write current.

With the lapse of time, the temperature of the record carrier 2 will more closely approximate to the temperature of the magnetic head 4 until the temperatures of the record carrier 2 and the magnetic head 4 have become substantially equal. This means that the influence of the control signal supplied by the sample-and-hold circuit 17 must be reduced slowly to zero. For this purpose a leakage control signal is applied to a control input 22 of the sample-and-hold circuit 17, under the influence of which the control signal on the output 20 is slowly reduced to zero.

If a recording on a record carrier which has just been inserted into the device is started, the temperature difference between the record carrier and the magnetic head will be larger than in the case that the record carrier has been inserted into the device some time ago. In the first-mentioned case the influence of the control system comprising the elements 15, 17 and 21 will be greater than in the second case.

We claim:

1. A device for recording an information signal on a magnetic record carrier, said device comprising:

an input terminal for receiving the information signal;

a write amplifier, having an input coupled to the input terminal and having an output coupled to an input of a magnetic head, said write amplifier being adapted to drive the magnetic head with a write current of a given amplitude; and compensation means for controlling the amplitude of the write current in dependence upon temperature variations which occur during recording, characterized in that the magnetic head is a magnetoresistive head, the compensation means comprising actuator means for bringing the record carrier into contact with the magnetic head before a recording is started, the compensation means further comprising detection means for detecting an output signal of the magnetic head produced as a result of the magnetic head being brought into contact with the record carrier, and the compensation means further comprising control signal generator means for generating a first control signal in response to said output signal which is representative of a temperature difference between the record carrier and the magnetic head, the compensation means being adapted to control the amplitude of the write current in dependence upon the first control signal.

2. A device as claimed in claim 1, characterized in that the control signal generator means are further adapted to subsequently gradually reduce the influence of the first control signal on the write current to zero as time elapses.

3. A device as claimed in claim 2, characterized in that the compensation means further comprise a temperature detector arranged near the magnetic head, said temperature detector detecting the temperature in the proximity of the magnetic head and generating a second control signal whose magnitude is a measure of the temperature in the proximity of the magnetic head, the compensation means further comprising a signal combination unit for combining the first and the second control signal so as to obtain a combined control signal, and the compensation means being adapted to control the amplitude of the write current in dependence upon the combined control signal.

* * * * *